Figure 3:
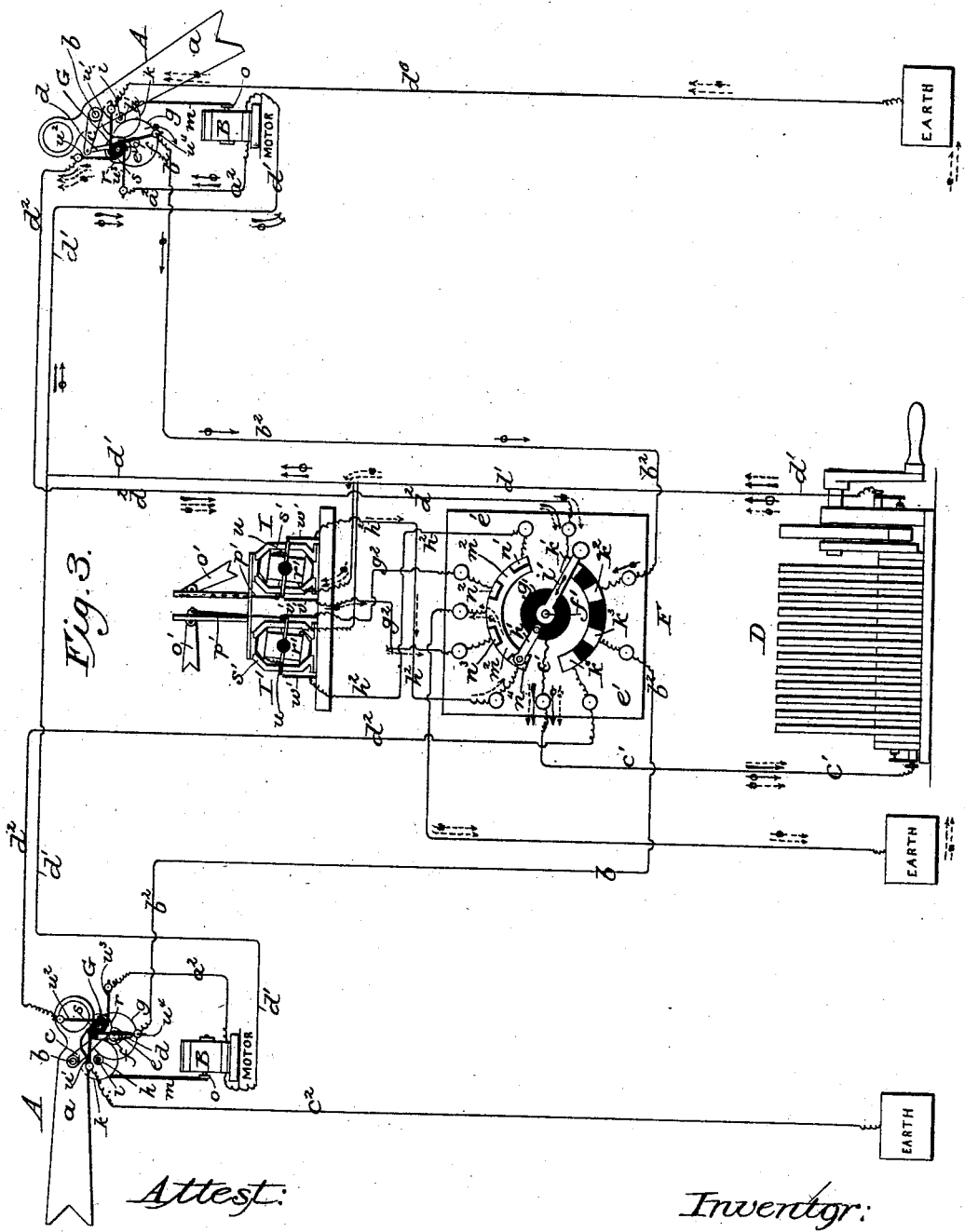

(No Model.) 8 Sheets—Sheet 1.
M. W. LONG.
MAGNETO SIGNALING APPARATUS.
No. 392,443. Patented Nov. 6, 1888.
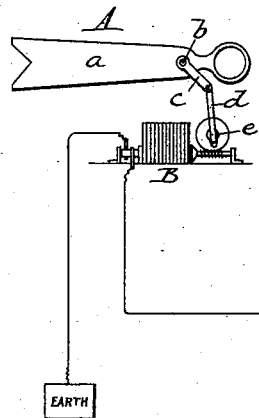
Fig. 1
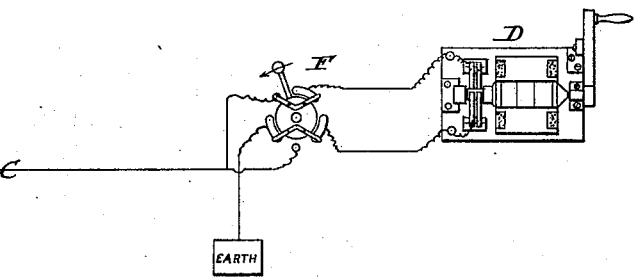
Fig. 2.
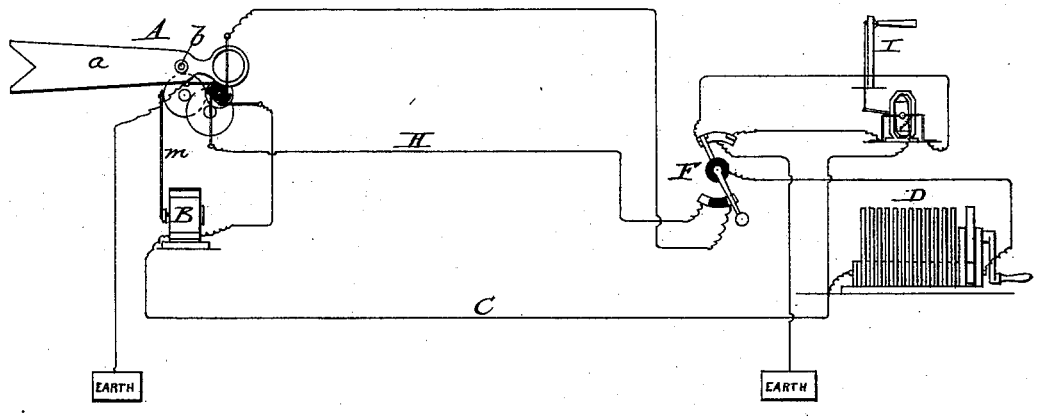
Fig. 1ª 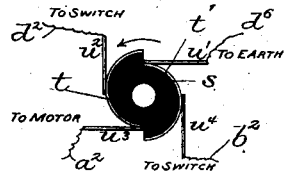 Fig. 1ᵇ 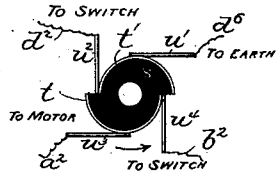
Fig. 1ᶜ 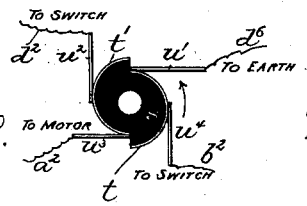
Attest:
Sidney P. Hollingsworth.
W. R. Kennedy.
Inventor:
M. W. Long.
By his Atty
Phil T. Dodge.

(No Model.) 8 Sheets—Sheet 2.

M. W. LONG.
MAGNETO SIGNALING APPARATUS.

No. 392,443. Patented Nov. 6, 1888.

(No Model.) 8 Sheets—Sheet 4.

M. W. LONG.
MAGNETO SIGNALING APPARATUS.

No. 392,443. Patented Nov. 6, 1888.

ON LINE 3—3

ON LINE 4—4

Attest:
Sidney P. Hollingsworth.
W. R. Kennedy.

Inventor:
M. W. Long.
By his Atty
Phil. T. Dodge.

(No Model.) 8 Sheets—Sheet 5.
M. W. LONG.
MAGNETO SIGNALING APPARATUS.

No. 392,443. Patented Nov. 6, 1888.

(No Model.) 8 Sheets—Sheet 6.
M. W. LONG.
MAGNETO SIGNALING APPARATUS.
No. 392,443. Patented Nov. 6, 1888.
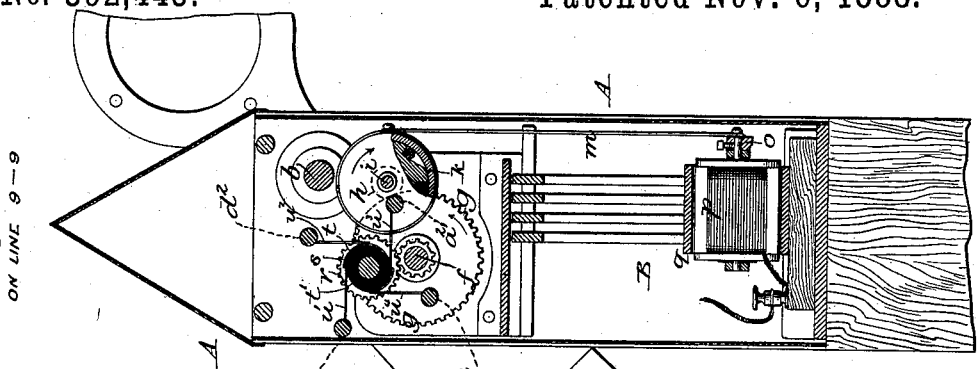
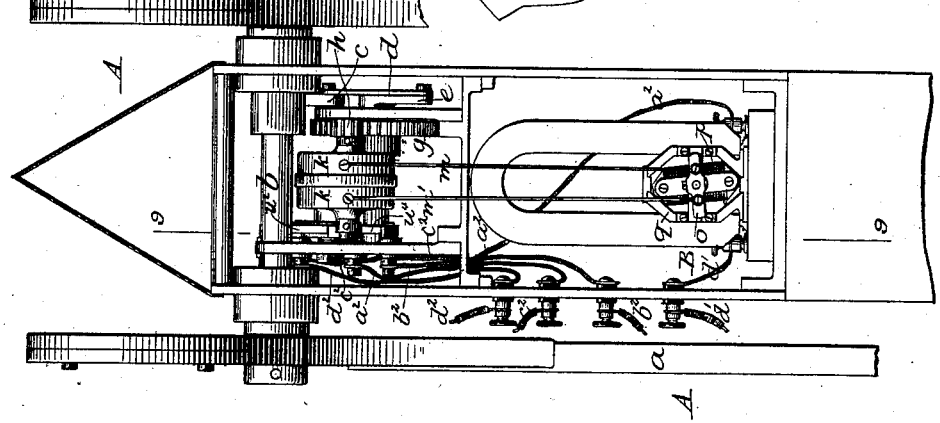
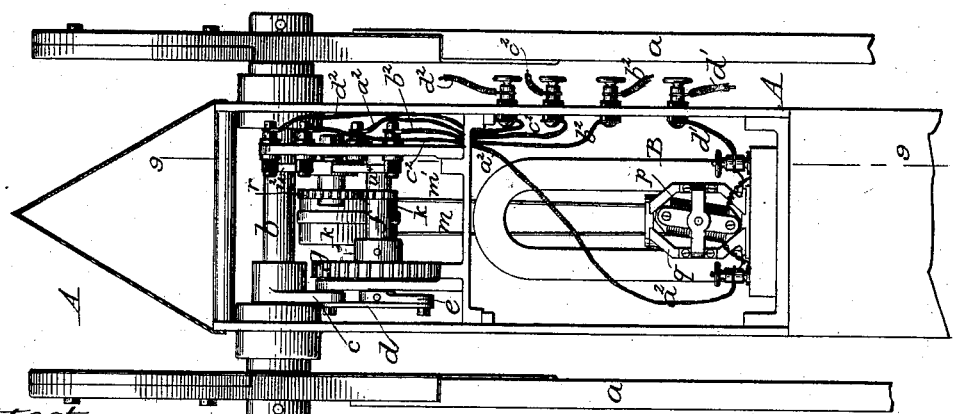
Attest:
Sidney P. Hollingsworth.
W. R. Kennedy.
Inventor:
M. W. Long.
By his Atty
Phil. T. Dodge.

(No Model.) 8 Sheets—Sheet 7.
M. W. LONG.
MAGNETO SIGNALING APPARATUS.
No. 392,443. Patented Nov. 6, 1888.
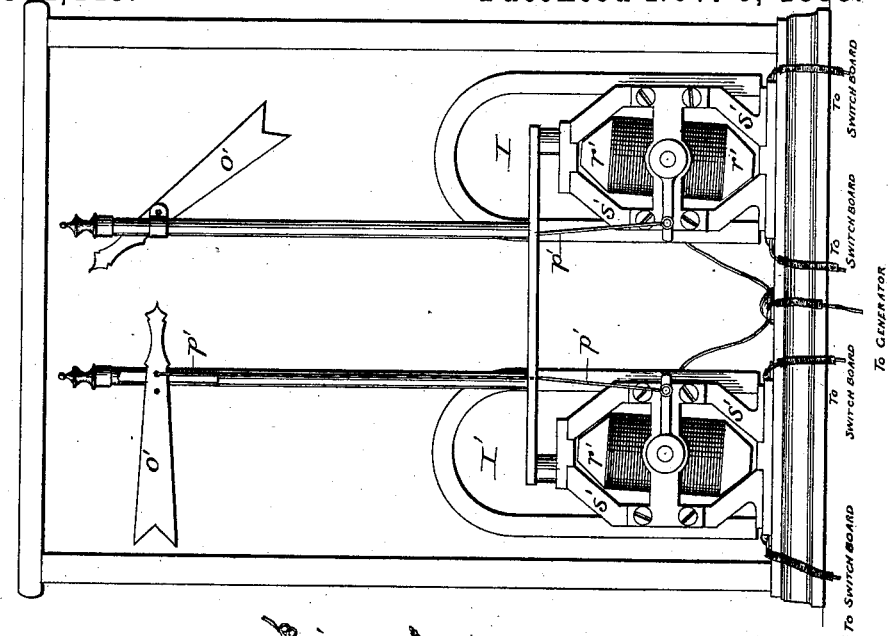
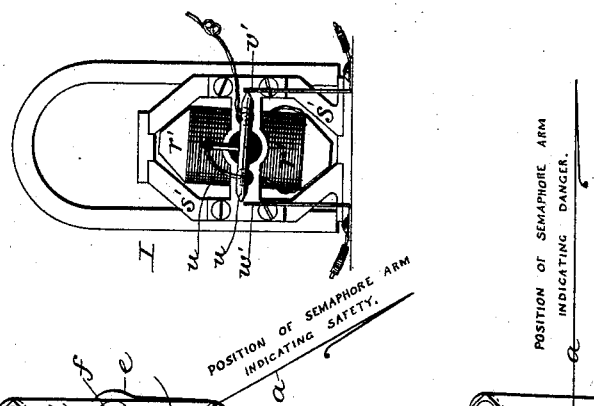
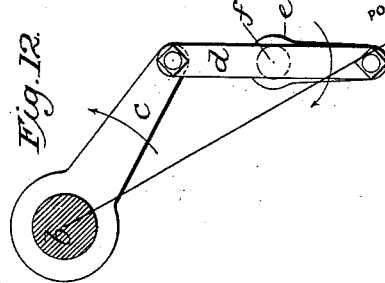
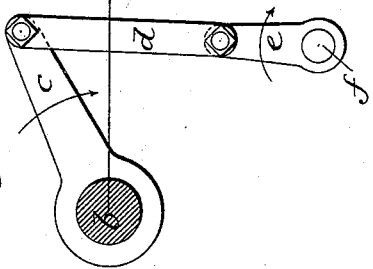
Attest:
Sidney P. Hollingsworth
N. R. Kennedy
Inventor:
M. W. Long.
By his Atty
Phil. T. Dodge.

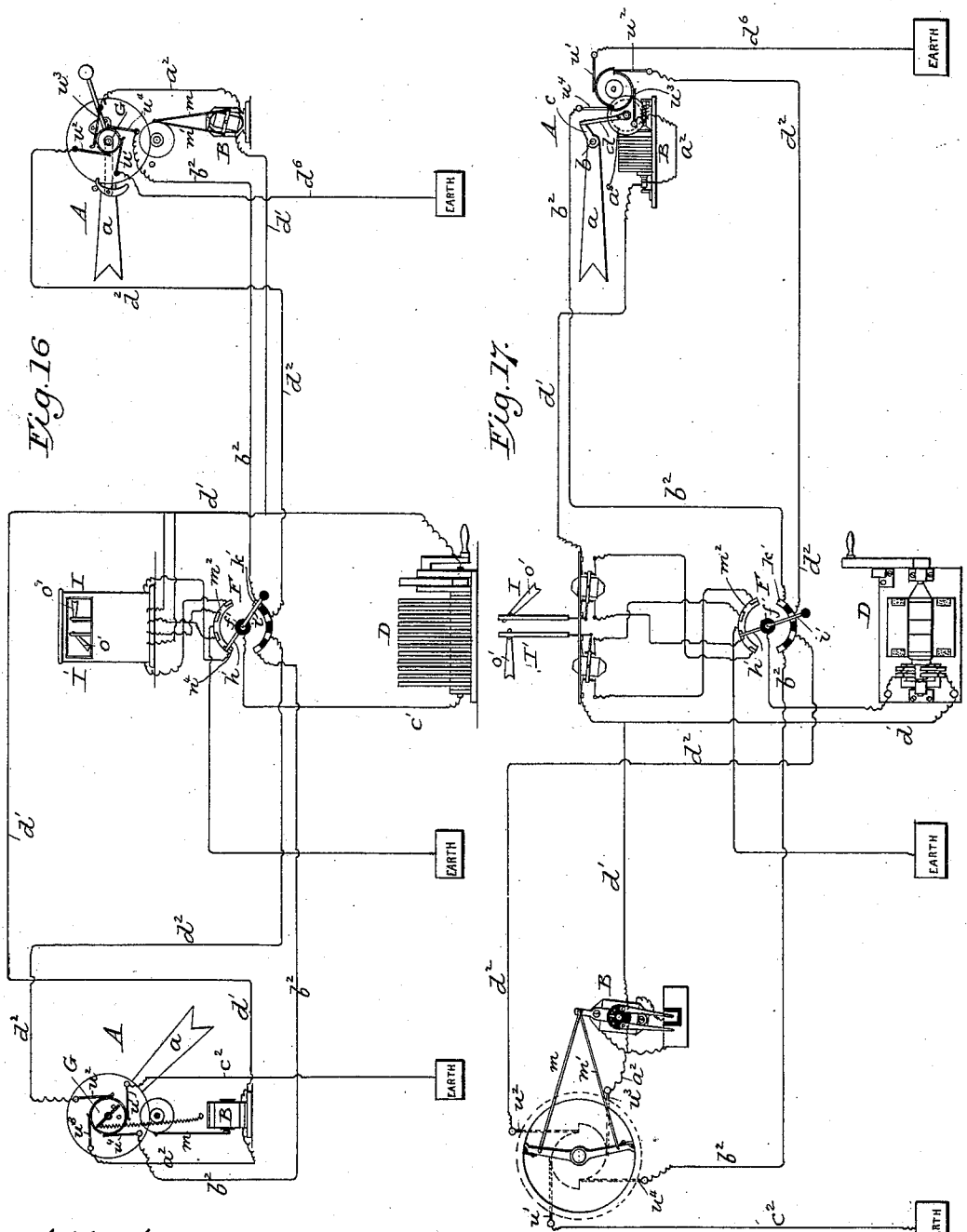

UNITED STATES PATENT OFFICE.

MALCOLM WALLACE LONG, OF HARRISBURG, PENNSYLVANIA.

MAGNETO-SIGNALING APPARATUS.

SPECIFICATION forming part of Letters Patent No. 392,443, dated November 6, 1888.

Application filed October 14, 1887. Serial No. 252,344. (No model.)

*To all whom it may concern:*

Be it known that I, MALCOLM WALLACE LONG, of Harrisburg, in the county of Dauphin and State of Pennsylvania, have invented certain Improvements in Magneto-Signaling Apparatus, of which the following is a specification.

The aims of my invention are, first, to provide a simple and reliable apparatus by which an attendant may positively adjust a distant signal to any required position; second, to provide for automatic indication at the controlling-station of the position of the distant signal.

To secure the first-named result I apply to a visual or other signal—such, for example, as a vibrating semaphore—an electric motor geared thereto to move the same positively to its different operative positions, and connect this motor by suitable conductors with a manual magneto-electric generator located at a controlling-station, so that when the generator is operated it will cause the motor to move the signal. A suitable switch is provided at the controlling-station to change the course of the current according to the direction in which the signal is to be moved, and in the preferred form of apparatus an automatic switch at the signal interrupts or diverts the current and stops the motor as soon as the signal reaches its limit of movement in either direction.

To secure the second result named I locate at the controlling-station an electro-magnetic indicator and connect the same by suitable conductors and an automatic switch in the signal with the main conductors, so that when the signal completes its movement the current is diverted through the second or return circuit to the indicator, causing the latter to show the changed position of the signal.

I prefer to operate two signals to the right and left, respectively, of the station from one generator, and I have therefore shown in the drawings all the details of a duplicate apparatus for this purpose, and have also shown in outline the more simple forms of the apparatus.

On steam-railways at the present day there are stations where trains of certain character—such as express-trains, long freight-trains, and the like—do not ordinarily stop. It is sometimes desirable, however, to hold or stop trains at one of these stations, and for this purpose danger or caution signals are used at a distance in advance of the station. It is desirable to place this signal about a mile from the station, in order to afford ample time for the stoppage of the train. Heretofore, in practice, these signals have been operated by hand, the connections being of such character that they could not be operated with certainty at a distance of more than a thousand yards from the station. This distance being insufficient, heavily-loaded and rapid trains are compelled to stop suddenly and violently, and oftentimes run past the station, so that they are compelled to back up.

My apparatus is more particularly intended for the uses above mentioned, although it is understood that it is also adapted for use in other places.

Figure 4:
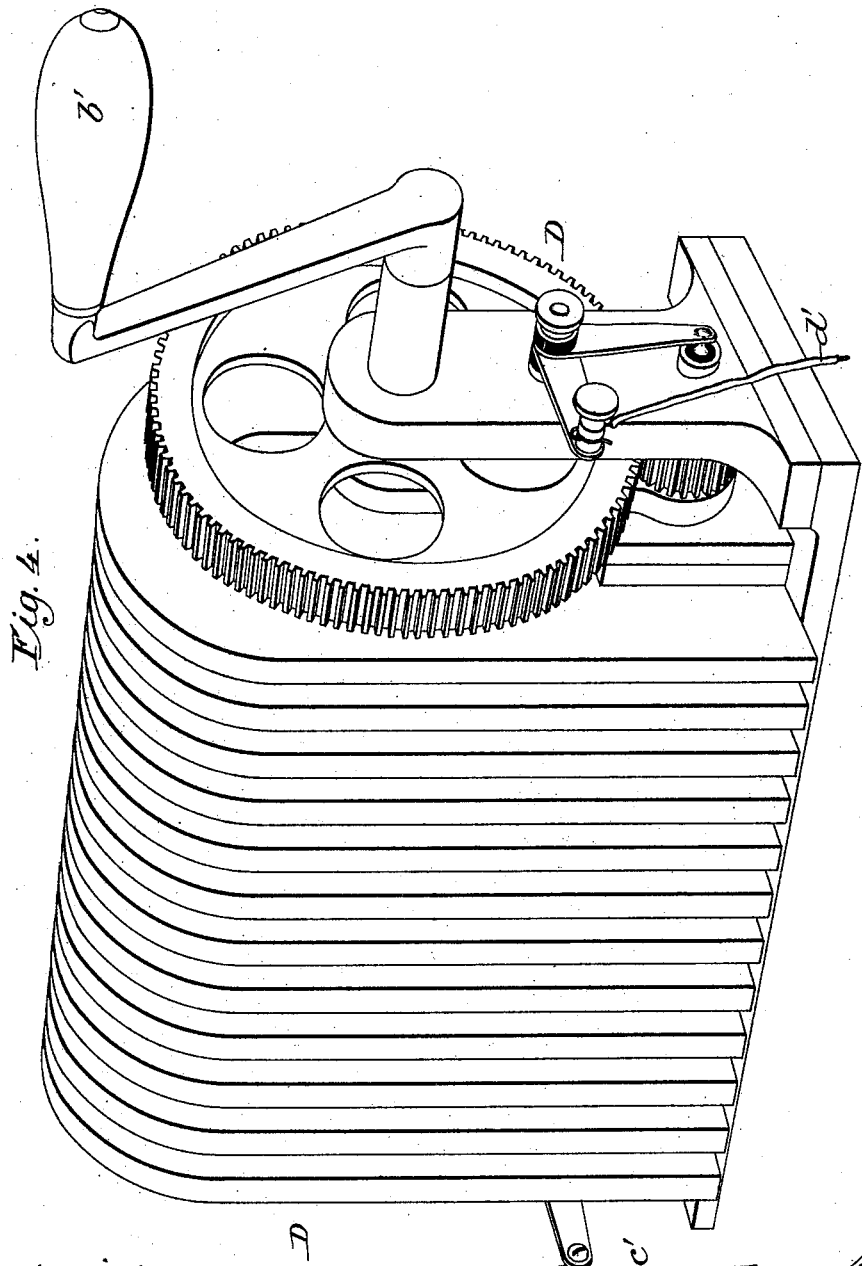
Figure 5:
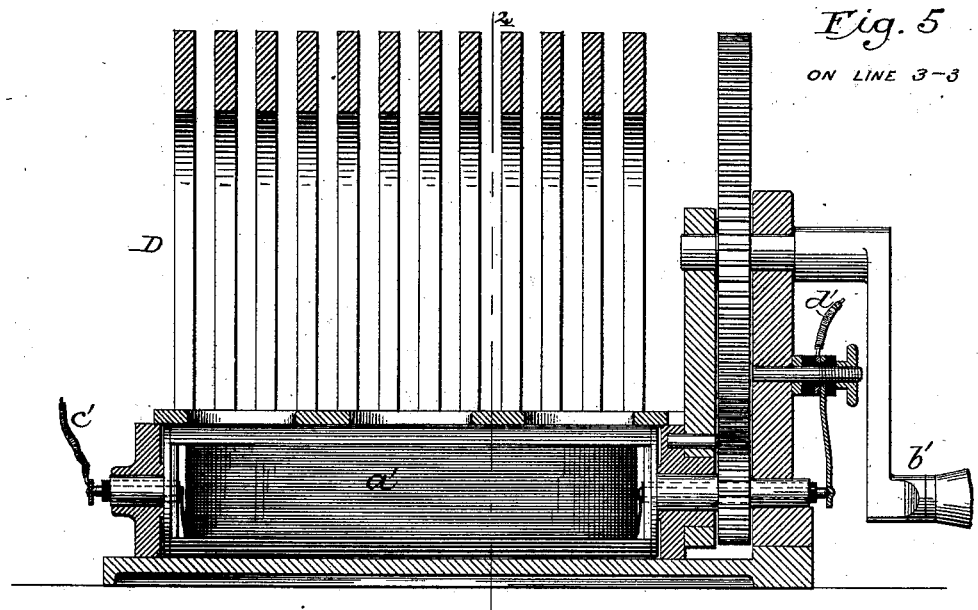
Figure 6:
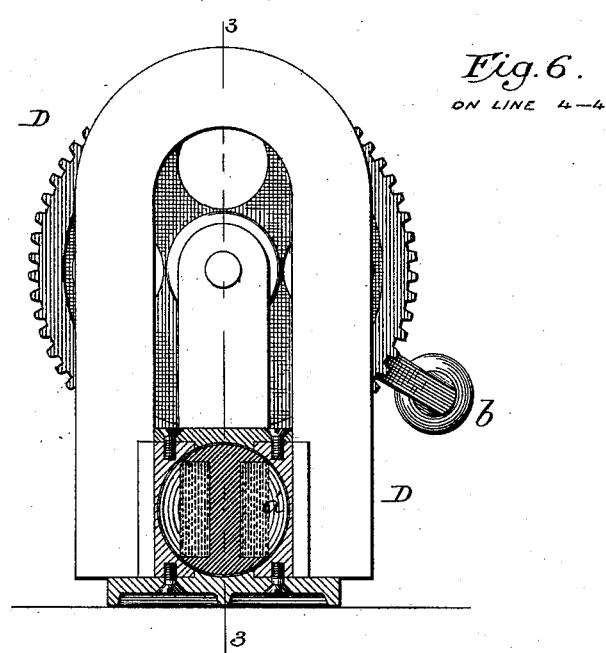
Figure 7:
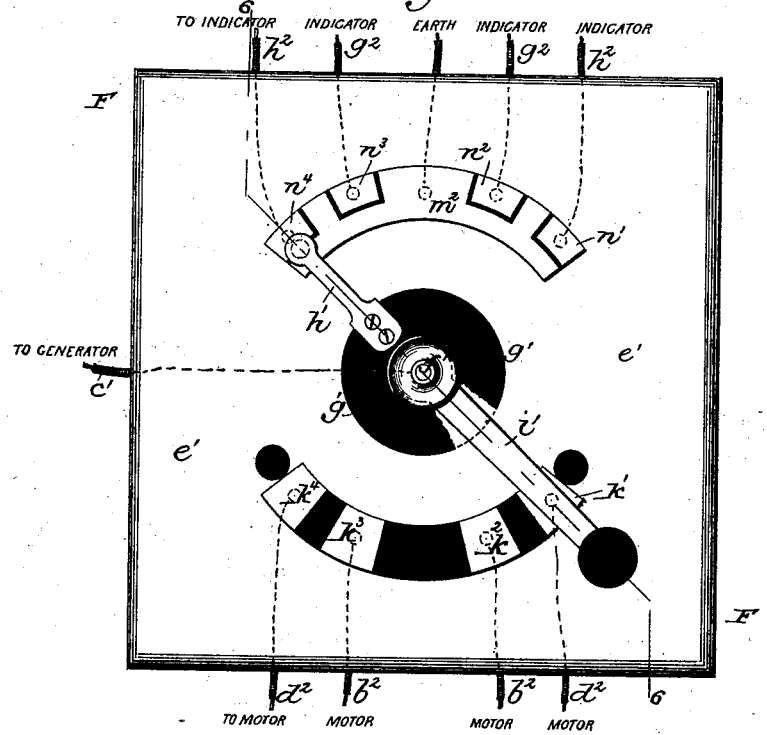
Figure 8:
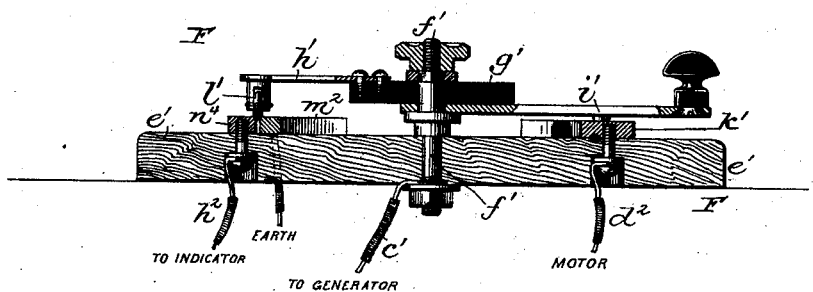

In the accompanying drawings, Figure 1 is a diagram illustrating my apparatus adapted for operating a single signal from a generator, no indicator being used. Fig. 2 is a similar view of the apparatus with the automatic indicator or tell-tale plate applied thereto. Fig. 3 is a diagram illustrating the duplex apparatus with signals to the right and left of the controlling-station and with automatic indicators. Figs. 1$^a$, 1$^b$, and 1$^c$ are diagrams illustrating the different positions and connections of the automatic switch through which the motor and indicator circuits are completed. Fig. 4 is a perspective view of the magneto-generator at the controlling-station. Figs. 5 and 6 are vertical sections of the same on the lines 3 3 and 4 4, respectively. Fig. 7 is a face view of the switch-board at the controlling-station. Fig. 8 is a transverse section of the same on the line 6 6. Figs. 9 and 10 are elevations of one of the signals and its motor viewed from opposite sides. Fig. 11 is a vertical section through the same on the line 9 9. Figs. 12 and 13 are diagrams showing the different positions of the signal-operating devices. Fig. 14 is a front elevation of the duplex indicator at the controlling-station. Fig. 15 is an elevation of one of the indicator-magnets and its switch-connections. Figs. 16 and 17 are diagrammatic views showing my system in two additional forms, the equivalents of that illustrated in Fig. 3.

Fig. 1 illustrates my signal in its most simple form, A representing an ordinary semaphore-signal; B, an electro-magnetic motor connected to the signal for the purpose of moving the same to and fro; C, a main-line conductor extending from the motor to a magneto-electric generator, D, located at the controlling-station, and F a switch by which the direction of the current from the magneto through the conductor and motor may be reversed at will. The two parts of the line being grounded and the generator being operated by a hand-crank and gearing supplied for the purpose, the current is transmitted from the controlling-station to the motor and the distant signal and the signal moved in one direction or the other, according to the position of the switch F. I commonly provide the motor with an automatic switch, G, which acts to open the circuit when the signal reaches either limit of its movement, the action of the motor being thus stopped and the parts relieved from unnecessary strain. It will be observed that in this form of the apparatus there is no positive indication at the controlling-station of the position of the signal, the operator being compelled to rely wholly upon the efficiency of the apparatus.

In Fig. 2 the signal, its motor, the main conductor, the magneto-generator, and the reversing-switch F are all arranged as in the first apparatus. The second conductor, H, is, however, returned from the signal motor to the home station and there connected with an electro-magnetic indicator, I, which may be grounded, as shown. In the first instance the automatic switch G is so constructed that when the signal reaches its limit of motion in either direction the circuit will be completed from the main line C through the return-line H and indicator I, whereby the indicator is caused to show at the controlling or sending station the position of the distant signal.

The apparatus shown in Fig. 3 is essentially the same in its general organization as that shown in Fig. 2, except only that a second indicator is provided and the conductors carried from the generator D to a second signal, a suitable switch serving to direct the current to one or the other of the signals as occasion may demand. As the generator, the motor, and the automatic signals are identical in all forms of the apparatus, I will now describe in detail the parts represented in Fig. 1.

Each of the signals A consists of a semaphore-arm, $a$, mounted on a horizonal pivot, $b$, and adapted to vibrate vertically in the ordinary manner. The pivot $b$ is provided with a crank-arm, $c$, connected by a link, $d$, to a shorter revolving crank, $e$. The crank-shaft $f$ of the crank $e$ carries a large gear-wheel, $g$, receiving motion through a pinion, $h$, from a shaft, $i$. The shaft $f$ is turned a half-revolution at a time by the action of two friction clutches, $k$ and $k$, of familiar construction, each clutch consisting simply of a loose ring encircling a peripherally-notched hub on the shaft with a series of rollers seated in the notches, so that when turned in one direction the ring will move freely, but when turned in the opposite direction it will cause the rollers to bite upon the hub and impart motion to the latter. The two clutches are connected by rods $m$ and $m'$ to a cross-arm, $o$, on the axis of a vibrating electro-magnet, $p$, working within an armature, $q$, these parts constituting a vibratory electric motor which may be in all respects indentical with that described in Letters Patent of the United States granted to me on the 1st day of March, 1887, No. 358,682. When the signal is in its lower position, its immediate connections stand as in Fig. 12, the crank $e$ being turned downward. When, however, the motor is set in action for a sufficient length of time to give the crank $e$ a half-revolution, it assumes the upright position shown in Fig. 13, and in so doing turns the signal to upper position, the crank standing directly beneath and in line with the link $d$, so that the signal is locked securely in place. The next half-revolution of the crank in a forward direction will return the parts to their original position with the semaphore depressed.

In the train of the motor I place on a special stud or shaft a switch-pinion, $r$, carrying on its side a non-conducting hub or ring, $s$, (see Figs. 1$^a$, 1$^b$, &c.,) the periphery of which is divided into two eccentric portions, each extending half-way round the same and bearing conducting-surfaces $t$ and $t'$. The construction is such that the end of one of these surfaces stands out of line with the other, being separated by the vertical shoulder or break in the surface. Four conducting-springs, $u'$ $u^2$ $u^3$ $u^4$, bear upon the conducting-surfaces $t$ $t'$ in the manner shown and are connected, as herein described, with the several circuits of the apparatus.

The foregoing parts constitute a complete signal, motor, and automatic switch, and in Fig. 3 are shown in duplicate at the right and left of the controlling-station.

The generator D (shown in detail in Figs. 4, 5, and 6) is of the ordinary Siemens type, consisting of a series of permanent horseshoe-magnets with pole-pieces embracing a rotary armature, $a'$, which is connected through intermediate gear with a crank, $b'$, so that the armature may be given a rapid rotation by hand. The usual conductors, $c'$ and $d'$, are provided for the transmission of the current from the generator.

The switch-board at the central station, which controls both the signal-circuits and the indicator-circuits, is constructed as shown in Figs. 7 and 8. A non-conducting board or plate, $e'$, is provided with a central conducting-stud, $f'$, connected to the conductor $c'$ of the generator. On the stud is mounted, to turn with a moderate friction, a non-conducting collar, $g'$, carrying on one side an insulated conducting-finger, $h'$, to control the indicator-circuit, and carrying on the opposite side, in contact with its stud $f'$, a conducting-arm, $i'$, through which the generator-current is conducted to the signal-motor. The conducting-arm $i'$ is arranged to travel over and make contact successively with metallic plates $k'$ $k^2$ $k^3$ $k^4$, insulated from each other and from the support, but connected to conductors leading to the signal-motors, as hereinafter explained. The arm $h'$ bears at its end a conducting-roller, $l'$, with a beveled edge. This roller is arranged to traverse an insulated plate, $m^2$, connected with a ground and notched in its edge to receive the insulated conducting-plates $n'$ $n^2$ $n^3$ $n^4$, from which conductors lead to the signal-magnets, as hereinafter explained. The parts are so arranged as to leave a small space between the plates $n'$ $n^2$, &c., and the plate $m^2$, in which spaces the beveled edge of the roller rides as it is moved to and fro. The arm $h'$ being elastic and urging the roller downward, the latter is caused to establish perfect connection between the plate $m^2$ and the smaller plate, with which it is, for the time being, in contact.

The indicators I and I', which are duplicates of each other, are constructed as shown in Figs. 3, 14, and 15. Each indicator consists of a miniature semaphore-arm, $o'$, pivoted to swing vertically, and connected by a rod, $p'$, to an arm attached to a vibratory electro-magnet, $r'$, seated within an armature, $s'$, in essentially the same manner that the magnets of the motor are mounted, so that as the current is directed through the magnet in one direction or the other the magnet will tip to the right or left and throw the arm $o'$ upward or downward.

In order that the circuit may be automatically broken as soon as the indicator has been moved in either direction and the connections suitably established to direct the current in a reverse course through the indicator-magnet on the reclosing of the main circuit, I attach to the indicator-magnet insulated therefrom a conductor, $u$, connected permanently with one end of the circuit and arranged to vibrate at its opposite extremities past two conducting-fingers, $v'$ and $w'$, with which it makes contact alternately. The magnet and indicator being in one position, as shown in Fig. 15, the circuit is completed through the conductor $v'$, whereupon the magnet tips to the opposite side, changing the position of the indicator, breaking the circuit through the conductor $v'$, and establishing connection with the conductor $w'$, so that the reverse current will cause the magnet to resume its original position.

The connections are as follows: The conductor $d'$ from the generator has branches carried to the right and left to the motors of the two signals. On the opposite side the motor of the left signal is connected by a conductor, $a^2$, with the switch-spring $u^3$ of the motor. The switch-spring $u^4$ of the motor is connected by conductor $b^2$ with the plate $k^3$ of the central switch-board. The switch-spring $u'$ is connected by conductor $c^2$ with the ground. The switch-spring $u^2$ is connected by conductor $d^2$ with the plate $k^4$ of the central switch. The motor of the right-hand signal is connected in like manner, its switch-springs connecting through the conductors $b^2$ and $d^2$ with the plates $k^2$ and $k'$ of the central switch. The left indicator, I', has its conductors $v'$ and $w'$ connected by wires $g^2$ and $h^2$ with the plates $n^2$ and $n'$ of the central switch. The signal I on the right has its conductors connected by corresponding wires with the plates $n^3$ and $n^4$ of the switch-board. The switch in each motor is timed to make a quarter-revolution during each half-revolution of the signal-operating crank $d$, or, in other words, to make a quarter-revolution while the signal is moving from either extreme to the other.

In order that the operation may be clearly understood, I have in the drawings represented one signal in its elevated and the other in its depressed position. It will, of course, be understood that the parts of each signal assume the two positions alternately.

The operation is as follows: Assume the parts to be in the positions represented on the right hand in Fig. 3, the signal at "safety" and the switch-arm $i'$ at the extreme right. If now the generator is operated, a current will pass along the wire $d'$, following the direction of the arrow to the signal motor, which, being thereby set in motion, lifts the signal-arm to "danger." The current passes from the motor to switch-finger $u^3$, surface $t$ of the switch to finger $u^2$, by wire $d^2$ to plate $k'$ of the central switch; thence by switch-arm $i'$ and wire $c'$ to generator, completing the circuit. The motor is operated until the signal-arm assumes an elevated position, such as shown in the left-hand signal. As it reaches this position the motor-switch will have completed a quarter-revolution to the position shown in Fig. 1$^{\text{b}}$. As it reaches this position the finger $u^2$ drops from the conducting-surface $t$ to the surface $t'$, thus breaking the circuit through the motor. The current will then pass, as shown by the dotted arrows, from the generator, through conductor $d'$, to the indicator-magnet $r'$, to arm $u$, finger $v'$, and by a wire to contact-plate, $n^4$, of the central switch-board. The roller $l'$ of this switch being at this time in the position shown in Fig. 3, it connects the plate $n^4$ with plate $m^2$, through which the current passes to the earth, and thence through wire $d^3$ to finger $u'$, conducting-surface $t'$, finger $u^2$, wire $d^2$, plate $k'$, arm $i'$, and wire $c'$ to the generator. This completes a circuit from the generator to the signal and back through the indicator, causing the arm of the latter to rise to the same position as that of the signal. The indicator-magnet moves at the first revolution of the armature after the circuit is established, as above, and in moving it breaks the circuit-connection through the finger $v'$, leaving the circuit open, so that the continued action of the generator is without further effect. In thus moving the signal the indicator establishes connection with conducting-finger $w'$ preparatory to the closing of the indicator-circuit therethrough, when the signal is to be moved to its opposite position. The motor-switch is left at the conclusion of the operation in such position that when the switch-arm $i'$ is moved to contact-plate $k^2$ the current from the generator over the main line $d'$ will again start the motor to move the signal.

While I have represented in the figures already described a generator which produces an alternating current, and a motor which is operated by such current, it is to be understood that the generator may be replaced by either of the known generators which produce a continuous current, and that in such case the motor shown in the drawings may be replaced by any suitable motor which operates under the influence of a continuous current, various motors of this character being now known in the art.

In Fig. 17 I have represented a signal-system substantially identical with that shown in Fig. 3. The rotary generator is, however, provided with a commutator that it may transmit a current of constant polarity over the line. The motor on the left is of the vibratory type, and is provided with switch-fingers by which it automatically reverses the course of the current through it after each vibration. The motor is connected by pitman to clutch-arms mounted on a common center and acting on the inside of the signal-operating wheel. This clutch, being familiar to every mechanic, need not be described in detail. The signal on the right hand is actuated by a motor of the rotary type having the usual commutator that it may be operated by a continuous current. The motor commonly known in the market as the "C and C" motor will answer an excellent purpose in this connection. The motor in this instance has its armature provided with a worm-wheel, $a^8$, which drives the signal-operating crank.

In Fig. 16 I have represented a system which is also the same in its general organization as that shown in Fig. 3. The generator is of the alternating-current type, and the motor is the same as those represented in Fig. 3. The signal-arm, however, instead of being operated by a crank, as in the preceding examples, is connected through devices of a different form with the motor.

While I prefer to employ in every case a magneto or dynamo-electric generator with suitable devices for operating it by hand, I may, in special cases, employ in place of the generator and as its equivalent in the combination a battery to produce the current. When this is done, the other parts of the system may remain unchanged, as the switch at the station will enable the attendant to control and direct the battery current, so that it will operate the signal, the automatic switch, and the indicator in the same manner that they are operated by the magneto-generator.

It is to be particularly noted that my system embraces in every instance as an essential feature an electric motor or engine constructed and connected by intermediate devices with the signal proper in such manner that a continuing or prolonged action of the motor will steadily and positively move the signal. In this manner I am enabled to practically operate the ordinary semaphoric arms and other track-signals of large size requiring the expenditure of considerable power from a controlling-station without the attendance of an operator at the signal and without the employment of track-levers, weighted operating-trains, or other analogous devices. A clear distinction is to be drawn between my system, in which the motor actuates the signal, and those in which the current merely energizes an unlatching magnet to bring into play a mechanical motor. Neither is my system to be confounded with those in which a magnet in the signal-circuit by a single impulse causes the vibration of an indicator-needle in an office-instrument, or with those systems in which the current merely actuates an escapement serving to retard the movement in one direction of a signal moved by a weight and set for action by hand.

The expression "electric motor" is used herein in its ordinary sense, as indicating not merely a magnet and its armature, but a complete organization adapted to be actuated by electricity in a continuing manner, and adapted in its turn to actuate or impart motion to a gear-train or kindred mechanism.

Having thus described my invention, what I claim is—

1. A visual signal, an electric motor, and intermediate gearing through which the continuing action of the motor moves the signal positively to its different positions, in combination with a distant magneto generator, suitable electric conductors connecting the generator and motor, and manual devices for operating the generator, whereby the attendant is enabled to generate and apply an electric current to set the distant signal in a positive manner.

2. The combination, substantially as described and shown, of a visual signal, as a semaphore, an electric motor connected by suitable gearing to said signal to impart motion thereto, a distant magneto-generator provided with driving-gear and a manual operating device, suitable connections connecting the generator and motor, and an automatic switch adjacent to the motor for reversing the course of the current through the motor, whereby the action of the motor may be caused to move the signal positively in one direction or the other, as demanded.

3. The combination of a signal and an attached electric motor for operating the same, a distant electric generator, conductors connecting the generator and motor, and an automatic switch connected with the signal and acting to break the circuit through the motor when the signal reaches its limit of movement in either direction.

4. In an apparatus for setting distant signals from a controlling-station, the combination, substantially as shown, of a visual signal and an electric motor geared to the signal to move the same to its different positions, with a generator at the controlling-station, suitable intermediate conductors, a manual switch adjacent to the generator for reversing the course of its current through the circuit, and an automatic switch at the signal serving to break the circuit when a signal is moved and establish a new connection, that the current in the reverse direction may restore the signal to its original position.

5. In a railway-signal, the combination of a signal and an electric motor for actuating the same, a magneto-generator provided with manual operating devices and located at a distance from the signal, suitable conductors connecting the motor and generator, an electric indicator located adjacent to the generator, and an automatic switch connected with the motor and acting, as described, to establish a circuit through the indicator when the signal reaches its limit of movement, whereby the generator is rendered available, first, to positively move the signal, and, second, to actuate the indicator to show the position of the signal.

6. In a system for signaling to the right and left of the controlling-station, the combination, substantially as shown, of the two signals, each provided with an electric motor and an automatic switch, an electric generator at the central station, and a manual switch at the central station for sending the current in either direction through either motor at will, whereby the generator-current is rendered available for moving either signal in either direction at the will of the attendant.

7. In a signal system for transmitting signals to the right and left of the central station, the combination of two visual signals each provided with an electric motor and an automatic switch, a generator located at the central station, two electric indicators, also located at the central station, and a manual-switch located at said station and adapted, as described, to divert the current to one or the other of the signal-motors at will, whereby either signal may be operated in either direction and its changed position automatically indicated at the central station.

8. In combination with the vibratory semaphore-arm and the arm c attached to its axis, the pitman d, the operating-crank e, and the electric motor geared to the crank and adapted to turn the same in one direction only.

9. In an electric signal, the combination of the semaphore and its arm c, a pitman, d, operating-crank e, the electric motor geared to the crank, and the automatic switch driven by the motor and adapted to interrupt the motor-current at each half-revolution of the crank.

10. In combination with the semaphore and its arm c, the operating-crank e, and pitman d, the two clutch-wheels on its axis, and the vibrating motor-magnet connected to said clutch-wheels, as described, whereby the vibratory motion of the motor is caused to impart a continuing rotation in one direction to the crank-arm and the latter caused to raise and lower the signal.

11. In combination with the semaphore-arm, its actuating train and motor, the rotary switch geared to said train and adapted, as described, to interrupt the motor-circuit as the arm reaches each extreme of its movement.

12. In a railway-signal, the combination of the indicator-arm, the vibratory electro-magnet for actuating the same, the arm u, connected thereto, and the two conductors v' and w', said members arranged as described, whereby the changing position of the indicator is accompanied by a change in the circuit-connections.

In testimony whereof I hereunto set my hand this 23d day of September, 1887, in the presence of two attesting witnesses.

MALCOLM WALLACE LONG.

Witnesses:
  GEO. W. PARSONS,
  CHARLES H. BABB.